United States Patent
Nakano et al.

[11] Patent Number: 6,140,280
[45] Date of Patent: *Oct. 31, 2000

[54] SUCCINIMIDE COMPOUND AND METHOD FOR PRODUCING IT, LUBRICATING OIL ADDITIVE COMPRISING THE COMPOUND AND LUBRICATING OIL COMPOSITION COMPRISING THE COMPOUND FOR DIESEL ENGINE

[75] Inventors: Takeshige Nakano; Tadashi Katafuchi, both of Ichihara, Japan

[73] Assignee: Idemitsu Kosan Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,855

[22] Filed: Oct. 8, 1997

[30] Foreign Application Priority Data

Oct. 29, 1996 [JP] Japan .................... 8-286270
May 8, 1997 [JP] Japan .................... 9-118293

[51] Int. Cl.[7] .................... C10M 161/00; C10M 149/00
[52] U.S. Cl. .................... 508/291; 508/391; 508/460; 508/586
[58] Field of Search .................... 508/291, 391; 548/546

[56] References Cited

U.S. PATENT DOCUMENTS

| | | | |
|---|---|---|---|
| 3,154,560 | 10/1964 | Osuch .................... | 508/291 |
| 3,306,907 | 2/1967 | McNinch et al. .................... | 508/291 |
| 3,361,673 | 1/1968 | Stuart et al. .................... | 508/291 |
| 3,438,899 | 4/1969 | Benoit, Jr. .................... | 508/291 |
| 3,443,918 | 5/1969 | Kautsky et al. .................... | 508/291 |
| 3,488,284 | 1/1970 | LeSuer et al. .................... | 508/391 |
| 3,852,204 | 12/1974 | Souillard et al. .................... | 508/391 |
| 3,897,350 | 7/1975 | Heiba et al. .................... | 508/291 |
| 4,094,802 | 6/1978 | Soula et al. .................... | 508/291 |
| 4,502,970 | 3/1985 | Schetelich et al. .................... | 508/291 |
| 4,686,054 | 8/1987 | Wisotsky et al. .................... | 508/291 |
| 4,929,374 | 5/1990 | De Jong et al. .................... | 508/291 |
| 5,089,155 | 2/1992 | Marsh et al. .................... | 508/391 |
| 5,156,654 | 10/1992 | Koch et al. .................... | 508/291 |
| 5,235,067 | 8/1993 | Allen et al. . | |

FOREIGN PATENT DOCUMENTS

| | | |
|---|---|---|
| 0373829 | 6/1990 | European Pat. Off. . |
| 960493 | 6/1964 | United Kingdom . |
| 1087039 | 10/1967 | United Kingdom . |
| 1131925 | 10/1968 | United Kingdom . |
| 1131926 | 10/1968 | United Kingdom . |

*Primary Examiner*—Ellen M. McAvoy
*Attorney, Agent, or Firm*—Oblon, Spivak, McClelland, Maier & Neustadt, P.C.

[57] ABSTRACT

Disclosed are novel succinimide compounds effective in diesel engine lubricating oil for protecting engine parts from being corroded or worn by SOx. An acid compound of formula (I) or (II) is reacted with a polyamine to produce the succinimide compounds, which give an absorption peak ($\alpha$-peak) at $1640\pm cm^{-1}$ and an absorption peak ($\beta$-peak) at $1700\pm10$ $cm^{-1}$ in the IR spectral pattern with the ratio, $\alpha$-peak intensity/$\beta$-peak intensity, of being 0.12 or more.
[1]

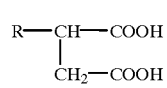

(I)

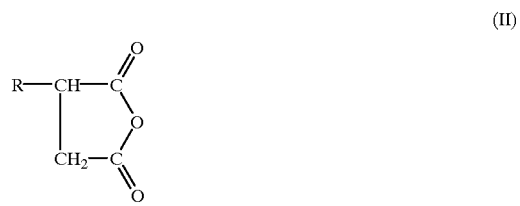

(II)

R is an alkenyl or alkyl group derived from a C2 to C15 olefinic polymer and having a number-average molecular weight of from 200 to 4000. The succinimide compound is added to base oil along with a metallic detergent-dispersant additives selected from over-based sulfonates, phenates and salicylates of alkaline earth metals to give a lubricating oil composition for diesel engines.

15 Claims, No Drawings

SUCCINIMIDE COMPOUND AND METHOD FOR PRODUCING IT, LUBRICATING OIL ADDITIVE COMPRISING THE COMPOUND AND LUBRICATING OIL COMPOSITION COMPRISING THE COMPOUND FOR DIESEL ENGINE

FIELD OF THE INVENTION

The present invention relates to novel succinimide compounds and a method for producing them, and a lubricating oil additive comprising the compound, and a lubricating oil composition comprising the compound for diesel engines.

BACKGROUND OF THE INVENTION

For the purpose of promoting the acid-neutralizing effect of metallic detergent-dispersant additives(metal type detergents)ents in lubricating oils, succinimide compounds are combined with the additives and added to various lubricating oils. As one example, hereinunder referred to is the use of succinimide compounds in lubricating oil for diesel engines.

In general, since fuel to be used in diesel engines has a large sulfur content, diesel engine exhaust gas contain a large amount of SOx (sulfur oxides). The SOx reacts with water vapor in the exhaust gas to give sulfuric acid. The sulfuric acid thus formed in large quantities breaks the oil film of the lubricating oil being used in diesel engines, thereby corroding and wearing the parts constituting the engines. In particular, in 2-cycle engines for ships, the cylinder liners and the piston rings are much corroded and worn by the acid. Therefore, it is extremely important for diesel engine lubricating oil to have the ability of resisting such corrosion and wear. Heretofore, a suitable amount of a perbasic, metallic detergent-dispersant additives has been added to lubricating oil, by which sulfuric acid formed in the oil is neutralized, resulting in that cylinder liners and piston rings are protected from being corroded or worn. However, the recent diesel engines in land vehicles are equipped with an exhaust gas recirculation (EGR) system for the purpose of reducing the amount of exhaust gas to be discharged from the engines, resulting in that the SOx content of the exhaust gas from those EGR-mounted engines tends to increase over that from the conventional diesel engines. Even in diesel engines for ships, low-quality fuel having a high sulfur content has become much used in these days for reducing the fuel cost. Therefore, the SOx content of the exhaust gas from those engines also tends to increase, like that from the recent diesel engines in land vehicles. Such a large amount of sulfuric acid as formed through the reaction of much SOx and water vapor could not be neutralized to such a degree that the thus-neutralized acid does no more corrode and wear engine parts, even if the amount of the perbasic, metallic detergent-dispersant additives to be added to engine lubricating oil is merely increased. Given that situation, a combination of the perbasic, metallic detergent-dispersant additives and an ashless dispersant has been tried, thereby promoting the acid-neutralizing effect of the metallic detergent-dispersant additives in order to protect the cylinder liners and piston rings of engines from being corroded and worn. For example, Japanese Patent Application Laid-Open No. 6-271885 discloses an additive comprising calcium salicylate and a bis-type alkenylsuccinimide in its Example, in which, however, the alkenylsuccinimide used requires the addition of an amine-molybdenum complex thereto in order to attain the intended object. Therefore, the development of succinimide compounds of a novel type is desired.

On the other hand, it is known that, in diesel engines, the acid-neutralizing speed of the metallic detergent-dispersant additives used has some relation to the corrosion and wear of the cylinder liners and the piston rings constituting the engines. Therefore, the acid-neutralizing speed of the agent in lubricating oil used in diesel engines shall indicate the ability of the lubricating oil of protecting cylinder liners and piston rings from being corroded and worn.

SUMMARY OF THE INVENTION

The invention has been made in consideration of the above-mentioned viewpoint, and its object is to provide succinimide compounds of a novel type and a method for producing them, to provide a lubricating oil additive comprising the compound, and to provide a lubricating oil composition to be used in diesel engines that discharge much SOx. Specifically, the lubricating oil composition for diesel engines of the invention is characterized in that it exhibits good corrosion resistance and wear resistance even when used in such diesel engines that discharge much SOx.

Having specifically noted the acid-neutralization speed of the metallic detergent-dispersant additives in lubricating oil for engines, we, the present inventors have assiduously studied and, as a result, have found succinimide compounds of a novel type. On the basis of this finding, we have completed the present invention.

Specifically, the first aspect of the invention is to provide succinimide compounds which are reaction products of an acid compound of the following general formula (I) or (II) and a polyamine, and which give an absorption peak (α-peak) at 1640±10 cm$^{-1}$ and an absorption peak (β-peak) at 1700±10 cm$^{-1}$ in the IR spectral pattern with the ratio of the intensity of the α-peak to that of the β-peak (intensity of α-peak/intensity of β-peak) of being 0.12 or more.
[2]

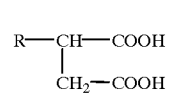

wherein R represents an alkenyl or alkyl group derived from a C2 to C15 olefinic polymer and having a number-average molecular weight of from 200 to 4000.

The second aspect of the invention is to provide a method for producing the succinimide compounds, which comprises reacting the acid compound with a polyamine in a molar ratio, acid compound/polyamine, of 2.0 or more.

The third aspect of the invention is to provide a lubricating oil additive comprising the succinimide compound.

The fourth aspect of the invention is to provide a lubricating oil composition for diesel engines, which comprises a base oil for lubricating oil, and (A) a metallic detergent-dispersant additives selected from over-based sulfonates, phenates and salicylates of alkaline earth metals, and (B) the succinimide compound.

DETAILED DESCRIPTION OF THE INVENTION

Now, the invention is described in detail hereinunder, referring to preferred modes of carrying out the invention.

In the first aspect of the invention, the acid compound to be reacted with a polyamine is represented by the following general formula (I) or (II):
[3]

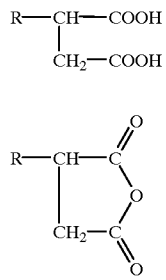

wherein R represents an alkenyl or alkyl group derived from a C2 to C15 olefinic polymer and having a number-average molecular weight of from 200 to 4000.

In formulae (I) and (II), R represents an alkenyl or alkyl group derived from a C2 to C15 olefinic polymer and having a number-average molecular weight of from 200 to 4000, preferably from 500 to 3000, more preferably from 700 to 2300. The preferred alkenyl group is a polyisobutenyl group.

The acid compound where R is an alkenyl group is obtained by reacting a polyisobutene or an ethylene-propylene copolymer with maleic anhydride or maleic acid. The acid compound where R is an alkyl group is obtained by hydrogenating the alkenyl group of R.

The succinimide compound of the invention is obtained by reacting the acid compound with a polyamine in a molar ratio, acid compound/polyamine, of 2.0 or more, preferably 2.2 or more. Examples of the polyamine include homodiamines such as ethylenediamine, propylenediamine, butylenediamine, pentylenediamine; and polyalkylene-polyamines such as diethylene-triamine, triethylene-tetramine, tetraethylene-pentamine, pentaethylene-hexamine, dibutylene-triamine, tributylene-tetramine, pentapentylene-hexamine. The succinimide compounds of the invention give an absorption peak (α-peak) at 1640±10 cm$^{-1}$ and an absorption peak (β-peak) at 1700±10 cm$^{-1}$ in the IR spectral pattern, in which the ratio of the intensity of the α-peak to that of the β-peak (intensity of α-peak/intensity of β-peak) is 0.12 or more, more preferably 0.15 or more. If the intensity ratio is less than 0.12, the acid-neutralizing effect of the compounds decreases unfavorably.

The intensity of the absorption peak referred to herein indicates the height of the peak from which is subtracted the background.

The third aspect of the invention is to provide a lubricating oil additive comprising the succinimide compound. In general, the amount of the succinimide compound to be in the additive may be from 0.25 to 40% by weight relative to the total weight of the additive, which, however, shall vary depending on the type of the lubricating oil to which the additive is added.

The fourth aspect of the invention is to provide a lubricating oil composition for diesel engines, which comprises a base oil for lubricating oil, and (A) a metallic detergent-dispersant additives selected from over-based sulfonates, phenates and salicylates of alkaline earth metals, and (B) the succinimide compound.

The base oil to be in the composition may be any of mineral oils and/or synthetic oils. Those mineral oils and synthetic oils are not specifically defined, and may be any ones generally used as base oils in lubricating oil for internal combustion engines. However, preferred are those having a kinematic viscosity at 100° C. of from 8 to 35 mm$^2$/s, more preferably from 10 to 25 mm$^2$/s. If the kinematic viscosity of the base oil used is too high, the fuel cost increases unfavorably. On the contrary, if too low, the lubricating oil evaporates too much, resulting in that the oil consumption increases unfavorably. The pour point of the base oil, which indicates its low-temperature flowability, is not specifically defined, but is preferably not higher than −10° C.

Known are various mineral oils and synthetic oils satisfying those requirements, from which may be selected appropriate ones for use in the invention. For example, mineral oils include paraffinic mineral oils, naphthenic mineral oils, and their mixed base oils. As specific examples for use in the invention, mentioned are solvent-purified or hydrogenated, light neutral oils, medium-gravity neutral oils, heavy neutral oils, and bright stocks.

Synthetic oils usable in the invention include, for example, poly-α-olefins, α-olefin copolymers, polybutenes, alkylbenzenes, polyol-esters, esters of dibasic acids, esters of polyalcohols, polyoxyalkylene glycols, esters of polyoxyalkylene glycols, and polyalkylene glycol ethers.

These base oils can be used in the invention either singly or as combined. As the case may be, mineral oils and synthetic oils can be combined for use in the invention.

The components (A) and (B) to be added to the base oil are described hereinunder.

Component (A)

The component (A) is a metallic detergent-dispersant additives to be selected from over-based sulfonates, phenates and salicylates of alkaline earth metals. Preferably, the dispersant has a total base number of from 100 to 600 mg KOH/g (as measured according to the perchloric acid in JIS K-2501). If its total base number is too low, the dispersant must be added to the base oil in large quantities in order to obtain the effect of the dispersant, which is disadvantageously uneconomical. However, if too high, the insoluble content of the additive increases, often resulting in unfavorable separation or precipitation of the lubricating oil.

The over-based, alkaline earth metal sulfonates are alkaline earth metal salts of various sulfonic acids, which are generally obtained by carbonating various alkaline earth metal salts of sulfonic acids. The sulfonic acids include, for example, aromatic petroleum sulfonic acids, alkylsulfonic acids, arylsulfonic acids, and alkylarylsulfonic acids. As specific examples, mentioned are dodecylbenzenesulfonic acid, dilaurylcetylbenzenesulfonic acid, paraffin wax-substituted benzenesulfonic acids, polyolefin-substituted benzenesulfonic acids, polyisobutylene-substituted benzenesulfonic acids, and naphthalenesulfonic acid.

The over-based, alkaline earth metal phenates are alkaline earth metal salts of alkylphenols or sulfurized alkylphenols, which are generally obtained by carbonating alkaline earth metal salts of alkylphenols or sulfurized alkylphenols.

The over-based, alkaline earth metal salicylates are alkaline earth metal salts of alkylsalicylic acids, which are generally obtained by alkylating phenols with $C_8$ to $C_{18}$ α-olefins, then introducing thereinto a carboxyl group through Kolbe-Schmitt's reaction, double-decomposing them, and finally carbonating them. Specific examples of the alkylsalicylic acids include dodecylsalicylic acid, dodecyl-methylsalicylic acid, tetradecylsalicylic acid, hexadecylsalicylic acid, octadecylsalicylic acid, and dioctylsalicylic acid.

The alkaline earth metals for those sulfonates, phenates and salicylates include, for example, calcium, barium, and magnesium. In view of the effect of the salts, preferred is calcium.

The component (A) may be one or more of those salts. The amount of the component (A) to be in the composition is preferably from 5 to 40% by weight, more preferably from 10 to 30% by weight, relative to the total weight of the composition. If its amount is less than 5% by weight, the synergistic, acid-neutralizing effect of the component (A) as combined with the component (B) will often be unsatisfactory. However, even if the component (A) is added to the composition in an amount of more than 40% by weight, the addition of such a large amount of the component (A) will not reflect on the increase in the intended effect.

Component (B)

The succinimide compound is used as the component (B). One or more of the compounds may be added to the composition. The amount of the component (B) is preferably from 0.1 to 3% by weight, more preferably from 0.3 to 2% by weight, relative to the total weight of the composition. If its amount is less than 0.1% by weight, the synergistic, acid-neutralizing effect of the component (B) as combined with the component (A) will often be unsatisfactory. However, even if the component (B) is added to the composition in an amount of more than 3% by weight, the addition of such a large amount of the component (B) will not reflect on the increase in the intended effect.

Regarding the total base number of the composition, if the number is too low, the acid-neutralizing effect of the composition is poor; but if too high, the composition produces a large amount of deposits. For these reasons, therefore, it is desirable that the composition is controlled to have a total base number of from 30 to 150 mg KOH/g (as measured according to the perchloric acid in JIS K-2501). More preferably, the number falls between 40 and 100 mg KOH/g.

Regarding the total nitrogen content of the composition, if the content is too low, the acid-neutralizing effect of the composition is poor; but if too high, the composition produces sludge with ease while it is oxidized and deteriorated. For these reasons, therefore, it is desirable that the composition is controlled to have a total nitrogen content of from 10 to 200 ppm by weight, more preferably from 20 to 100 ppm by weight.

The composition is obtained by adding the components (A) and (B) to base oil. In general, in order to improve the physical properties of the lubricating oil composition, various additives, such as antioxidants(oxidation inhibitors), viscosity index improvers, metal deactivators, pour point depressants, anti-wear agents, anti-foam additives and extreme pressure additives, may be added to the composition. Various types of those additives are known, any of which can be used in the invention with no limitation. For example, as antioxidants, known are amine compounds such as alkylated diphenylamines, phenyl-α-naphthylamines; and phenolic compounds such as 2,6-di-t-butylphenol, 4,4'-methylenebis-(2,6-di-t-butylphenol). In general, the antioxidant may be added to the composition in an amount of from 0.05 to 2% by weight relative to the total weight of the composition. As viscosity index improvers, for example, known are polyalkyl methacrylates, polyisobutylenes, ethylene-propylene copolymers, styrene-isoprene copolymers, and hydrogenated styrene-butadiene copolymers. In general, the viscosity index improver may be added to the composition in an amount of from 0.5 to 30% by weight relative to the total weight of the composition. As metal deactivators, for example, known are benzotriazoles, thiadiazoles, and alkenylsuccinates. In general, the metal deactivator may be added to the composition in an amount of from 0.005 to 1% by weight relative to the total weight of the composition. As pour point depressant, for example, known are polyalkyl methacrylates, and polyalkylstyrenes. In general, the pour point depressant may be added to the composition in an amount of from 0.01 to 1% by weight relative to the total weight of the composition. As anti-wear agents, for example, known are organic molybdenum compounds such as molybdenum dithiophosphate, molybdenum dithiocarbamate; organic zinc compounds such as zinc dithiophosphate; organic boron compounds such as alkylmercaptyl borates; and also other anti-wear solid lubricants such as graphite, molybdenum disulfide, antimony sulfide, boron compounds, polytetrafluoroethylenes. In general, the anti-wear agents may be added to the composition in an amount of from 0.1 to 3% by weight relative to the total weight of the composition. As anti-foam additives, for example, known are dimethylpolysiloxanes and polyacrylates. In general, the anti-foam additives may be added to the composition in an amount of from 0.0005 to 1% by weight relative to the total weight of the composition. As extreme pressure additives, for example, known are sulfurized oils and fats, and diallyl disulfide. In general, the extreme pressure additives may be added to the composition in an amount of from 0.1 to 15% by weight relative to the total weight of the composition.

Now, the invention is described in more detail with reference to the following Examples, which, however, are not intended to restrict the scope of the invention.

EXAMPLES 1 TO 3, AND COMPARATIVES EXAMPLES 1 AND 2

Polyisobutenylsuccinic anhydride of which the polyisobutenyl group has a number-average molecular weight of 1000, was reacted with tetraethylene-pentamine or pentaethylene-hexamine in the ratio shown in Table 1 below to produce succinimide compounds. 0.5% by weight of the succinimide compound and 14.0% by weight of calcium sulfonate having a total base number of 500 (as measured according to the perchloric acid in JIS K-2501) were added to 85.5% by weight of a mineral base oil having a kinematic viscosity at 100° C. of 20 mm²/s, to produce lubricating oil compositions for diesel engines of Examples and Comparative Examples. These compositions were tested in the methods mentioned below to determine their acid-neutralizing speed and stability. The data obtained are shown in Table 1.

(1) Method for Measuring Acid-neutralizing Speed 100 g of the sample oil of Examples and Comparative Examples was put into a 1-liter, branched, round-bottom flask, and heated up to 50° C., to which was added 1 ml of 35.9 N sulfuric acid, and stirred. Carbon dioxide gas was formed in the flask through the acid neutralization of the following (1):

$$CaCO_3 + H_2SO_4 \rightarrow CaSO_4 + H_2O + CO_2 \uparrow \qquad (1)$$

From the pressure variation caused by the thus-formed carbon dioxide gas (the inner pressure increased in 30 seconds after the addition of sulfuric acid), the acid-neutralizing speed of the sample was obtained. The sample giving a larger pressure increase is evaluated to have a higher ability of preventing such corrosion and wear.

(2) Stability Test

The compositions of Examples and Comparative Examples were stored for one month, and their transparency was measured. In Table 1 below, "O" indicates that the stored sample was transparent, and "X" indicates that the stored sample was cloudy.

TABLE 1

|  | Example 1 | Example 2 | Example 3 | Comparative Example 1 | Comparative Example 2 |
|---|---|---|---|---|---|
| Polyisobutenylsuccinic Anhydride (g) | 206.6 | 302.9 | 275.4 | 342.0 | 220.0 |
| Tetraethylene-pentamine (g) | 9.45 | — | — | 29.3 | 28.7 |
| Pentaethylene-hexamine (g) | — | 23.2 | 23.2 | — | — |
| Succinic Anhydride/Polyamine (by mol) | 3/1 | 2.2/1 | 2/1 | 1.6/1 | 1/1 |
| α-Peak Intensity/β-Peak Intensity | 0.27 | 0.15 | 0.12 | 0.11 | 0.08 |
| Internal Pressure Increase in 30 seconds (kg/cm$^2$) | 2.3 | 2.2 | 2.1 | 0.8 | 0 |
| Stability Test | ◯ | ◯ | ◯ | X | X |

As has been described in detail hereinabove, the lubricating oil composition for diesel engines of the invention, which comprises the novel succinimide compound, has an extremely high acid-neutralizing speed, while exhibiting the excellent effect of protecting engine parts from being corroded and worn by SOx discharged in large quantities. In particular, the composition is especially suitable as the cylinder oil to be in 2-cycle engines for ships.

While the invention has been described in detail and with reference to specific embodiments thereof, it will be apparent to one skilled in the art that various changes and modifications can be made therein without departing from the spirit and scope thereof.

What is claimed is:

1. A method for protecting 2-cycle diesel marine engines from corrosion and wear which comprises bringing components of said engine into contact with an effective amount of a lubricating oil composition which consists essentially of a base oil and (A) from 5 to 40% by weight of a metallic detergent-dispersant additive selected from over-based sulfonates, phenates and salicylates of alkaline earth metals and (B) from 0.1 to 3% by weight, relative to the total weight of the composition, of a reaction product of an acid compound of the following general formula (I) or (II) and a polyamine, selected from the group consisting of ethylenediamine, propylenediamine, butylenediamine, pentylenediamine, diethylene-triamine, triethylene-tetramine, tetraethylene-pentamine, pentaethylene-hexamine, dibutylene-triamine, tributylene-tetramine and pentapentylene-hexamine wherein the acid compound of formula (I) and (II) reacts with the polyamine in a molar ratio, acid compound/polyamine, of at least 3.0 and which give an absorption peak, α-peak, at 1640±10 cm$^{-1}$ and an absorption peak, β-peak, at 1700±10 cm$^{-1}$ in the IR spectral pattern with the ratio of the intensity of the α-peak to that of the β-peak, intensity of α-peak/intensity of β-peak, being 0.27 or more:

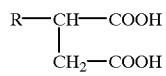

(I)

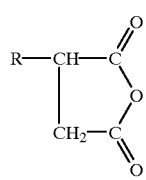

(II)

wherein R represents an alkenyl or alkyl group derived from a C2 to C15 olefinic polymer having a number-average molecular weight of from 500 to 3000.

2. A method according to claim 1 wherein the base oil is a mineral or a synthetic oil or a mixture thereof.

3. A method according to claim 1 wherein the base oil has a kinematic viscosity at 100° C. Of 8 to 35 mm$^2$/s.

4. A method according to claim 1 wherein component (A) has a total base number of 100 to 600 mg. KOH/g.

5. A method according to claim 1 wherein component (A) comprises calcium sulfonate or calcium phenate or calcium salicylate.

6. A method according to claim 1, wherein component (A) is present in an amount of 10 to 30% by wt. of the composition.

7. A method according to claim 1 wherein the total base number is 30 to 150 mg. KOH/g.

8. A method according to claim 1 wherein the total nitrogen content is from 10 to 200 ppm by wt.

9. A method according to claim 1 which further includes at least one additive selected from the group consisting of antioxidants, viscosity index improvers, metal deactivators, pour point depressants, anti-wear agents, anti-foam additives and extreme pressure compounds.

10. A method for protecting 2-cycle diesel marine engines from corrosion and wear which comprises bringing components of said engine into contact with an effective amount of a lubricating oil composition consisting essentially of:

A. a base oil selected from the group consisting of mineral oils, synthetic oils and mixtures thereof having a kinetic viscosity at 100° C. of from 8 to 35 mm$^2$/s;

B. from 5 to 40% by weight of the composition of metallic detergent-dispersant selected from the group consisting of overbased sulfonates, phenates and salicylates of alkaline earth metals, said dispersant having a total base number of from 100–600 mg KOH/g; and C. from about 0.1 to 3% by weight of the composition of a reaction product of an acid compound of the following general formula (I) or (II) and a polyamine, selected from the group consisting of ethylenediamine, propylenediamine, butylenediamine, pentylenediamine, diethylene-triamine, triethylene-tetramine, tetraethylene-pentamine, pentaethylene-hexamine, dibutylene-triamine, tributylene-tetramine and pentapentylene-hexamine wherein the acid compound of the formula (I) and (II) reacts with the polyamine in a molar ratio, acid compound/polyamine, of at least 3.0 and which give an absorption peak, α-peak, at 1640±10 cm$^{-1}$ and an absorption peak, β-peak, at 1700±10 cm$^{-1}$ in the IR spectral pattern with the ratio of the intensity of the α-peak to that of the β-peak, intensity of α-peak/intensity of β-peak, being 0.27 or more:

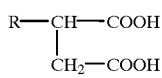

(I)

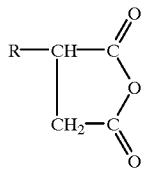

(II)

wherein R represents an alkenyl or alkyl group derived from a C2 to C15 olefinic polymer having a number-average molecular weight of from 500 to 3000, said composition having total base number of from 30–150 mg KOH/g and a total nitrogen of from 10 to 220 ppm.

11. A method according to claim 10 wherein component (B) is present in an amount of from 10 to 30% by wt.

12. In a 2-cycle diesel marine engine including cylinder liners, piston rings and cylinder oil, the improvement wherein the cylinder oil comprises a composition consisting essentially of:

A. a base oil selected from the group consisting of mineral oils, synthetic oils and mixtures thereof having a kinetic viscosity at 100° C. of from 8 to 35 mm²/s;

B. from 5 to 40% by weight of the composition of metallic detergent-dispersant selected from the group consisting of overbased sulfonates, phenates and salicylates of alkaline earth metals, said dispersant having a total base number of from 100–600 mg KOH/g; and C. from about 0.1 to 3% by weight of the composition of a reaction product of an acid compound of the following general formula (I) or (II) and a polyamine, selected from the group consisting of ethylenediamine, propylenediamine, butylenediamine, pentylenediamine, diethylene-triamine, triethylene-tetramine, tetraethylene-pentamine, pentaethylene-hexamine, dibutylene-triamine, tributylene-tetramine and pentapentylene-hexamine wherein the acid compound of the formula (I) and (II) reacts with the polyamine in a molar ratio, acid compound/polyamine, of at least 3.0 and which give an absorption peak, α-peak, at 1640±10 cm⁻¹ and an absorption peak, β-peak, at 1700±10 cm⁻¹ in the IR spectral pattern with the ratio of the intensity of the α-peak to that of the β-peak, intensity of α-peak/intensity of β-peak, being 0.27 or more:

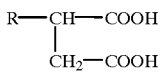

(I)

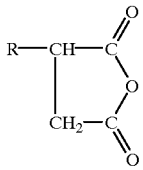

(II)

wherein R represents an alkenyl or alkyl group derived from a C2 to C15 olefinic polymer having a number-average molecular weight of from 500 to 3000, said composition having total base number of from 30–150 mg KOH/g and a total nitrogen content of from 10 to 220 ppm.

13. A marine engine according to claim 12, wherein component (B) of the composition is present in an amount of from 10 to 37% by weight.

14. A method according to claim 10, wherein said lubricating oil composition further includes at least one additive selected from the group consisting of antioxidants, viscosity index improvers, metal deactivators, pour point depressants, anti-wear agents, anti-foam additives and extreme pressure compounds.

15. A marine engine according to claim 12, wherein said composition of the cylinder oil further includes at least one additive selected from the group consisting of antioxidants, viscosity index improvers, metal deactivators, pour point depressants, anti-wear agents, anti-foam additives and extreme pressure compounds.

* * * * *